(12) United States Patent
Kulkarni et al.

(10) Patent No.: US 9,007,637 B2
(45) Date of Patent: Apr. 14, 2015

(54) GENERATING AN ALIAS EMAIL ADDRESS FOR MANAGING A PRINT JOB

(75) Inventors: Sudhindra Venkatesh Kulkarni, Bangalore (IN); Raviraj Avadhut Kandalgaonkar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/984,430

(22) PCT Filed: Feb. 17, 2011

(86) PCT No.: PCT/US2011/025293
§ 371 (c)(1),
(2), (4) Date: Aug. 8, 2013

(87) PCT Pub. No.: WO2012/112159
PCT Pub. Date: Aug. 23, 2012

(65) Prior Publication Data
US 2013/0308165 A1    Nov. 21, 2013

(51) Int. Cl.
*G06F 15/00* (2006.01)
*G06K 1/00* (2006.01)
*G06F 3/12* (2006.01)
*H04L 12/58* (2006.01)

(52) U.S. Cl.
CPC ............. *G06F 3/126* (2013.01); *G06F 3/1205* (2013.01); *G06F 3/122* (2013.01); *G06F 3/1257* (2013.01); *G06F 3/1268* (2013.01); *G06F 3/1287* (2013.01); *G06F 3/1288* (2013.01); *G06F 3/1247* (2013.01); *H04L 51/08* (2013.01)

(58) Field of Classification Search
None
See application file for complete search history.

(56) References Cited

U.S. PATENT DOCUMENTS

| | | | |
|---|---|---|---|
| 6,337,745 B1 | 1/2002 | Aiello, Jr. et al. |
| 6,552,813 B2 | 4/2003 | Yacoub |
| 6,909,518 B2 | 6/2005 | Miller et al. |
| 6,975,419 B2 | 12/2005 | Staas et al. |
| 7,019,861 B2 | 3/2006 | Aagesen |
| 7,079,276 B2 | 7/2006 | Kimura |
| 7,084,997 B2 | 8/2006 | Clough |
| 7,088,462 B2 | 8/2006 | Bhogal et al. |
| 7,096,265 B2 | 8/2006 | Simpson et al. |

(Continued)

FOREIGN PATENT DOCUMENTS

| | | |
|---|---|---|
| CN | 101004668 | 7/2007 |
| CN | 101237424 | 8/2008 |

(Continued)

OTHER PUBLICATIONS

"Intelligent Print job Routing", http://www.printech.com/intelligent_print_job_routing.htm, retreived on Dec. 15, 2010.

(Continued)

*Primary Examiner* — Ming Hon (57) ABSTRACT

One example discloses a network system for managing a print job. The network system can comprise a printing system. The printing system can comprise a memory for storing computer executable instructions and a processing unit for accessing the memory and executing the computer executable instructions. The computer executable instructions can comprise a printer server to route a print job to a selected printer of at least two printers based on a received email message, wherein an addressee of the received email message is associated with each printer of the at least two printers.

15 Claims, 7 Drawing Sheets

(56) References Cited

U.S. PATENT DOCUMENTS

| | | | |
|---|---|---|---|
| 7,167,264 B2 | 1/2007 | Takamiya | |
| 7,187,462 B2 | 3/2007 | Oakeson et al. | |
| 7,321,437 B2 | 1/2008 | Parry | |
| 7,441,003 B1 | 10/2008 | Takeda et al. | |
| 7,474,423 B2 | 1/2009 | Garcia et al. | |
| 7,503,636 B2 | 3/2009 | Ferguson et al. | |
| 7,656,547 B2 | 2/2010 | Kuo et al. | |
| 7,760,385 B2 | 7/2010 | Yamaguchi | |
| 7,791,747 B2 | 9/2010 | Roksz | |
| 8,179,549 B1 | 5/2012 | Evans | |
| 2002/0051180 A1* | 5/2002 | Shimbori et al. | 358/1.15 |
| 2002/0057449 A1* | 5/2002 | Chapman et al. | 358/1.15 |
| 2003/0011801 A1* | 1/2003 | Simpson et al. | 358/1.13 |
| 2003/0063309 A1* | 4/2003 | Parry | 358/1.15 |
| 2003/0107762 A1 | 6/2003 | Kinoshita et al. | |
| 2003/0160997 A1* | 8/2003 | Kimura | 358/1.15 |
| 2004/0073574 A1 | 4/2004 | Bouno et al. | |
| 2004/0126165 A1 | 7/2004 | Carroll | |
| 2004/0218201 A1* | 11/2004 | Lermant et al. | 358/1.13 |
| 2004/0218213 A1 | 11/2004 | Shimizu et al. | |
| 2005/0270569 A1 | 12/2005 | Hayashi | |
| 2005/0275876 A1* | 12/2005 | McLean et al. | 358/1.15 |
| 2006/0158681 A1* | 7/2006 | Yorimoto et al. | 358/1.15 |
| 2006/0250631 A1* | 11/2006 | Igarashi | 358/1.13 |
| 2006/0250638 A1* | 11/2006 | Wang et al. | 358/1.15 |
| 2006/0265473 A1 | 11/2006 | Muto | |
| 2007/0086038 A1* | 4/2007 | Matsuzaki | 358/1.13 |
| 2007/0146763 A1* | 6/2007 | Yokoyama | 358/1.13 |
| 2008/0062883 A1 | 3/2008 | Shima | |
| 2009/0009802 A1 | 1/2009 | Shaw et al. | |
| 2009/0027700 A1 | 1/2009 | Kim et al. | |
| 2009/0172143 A1 | 7/2009 | Ishimoto | |
| 2009/0219570 A1 | 9/2009 | Fujisawa | |
| 2009/0248632 A1 | 10/2009 | Subramanian | |
| 2009/0273810 A1 | 11/2009 | Gupta et al. | |
| 2010/0020349 A1 | 1/2010 | Carroll | |
| 2010/0309510 A1* | 12/2010 | Hansen | 358/1.15 |
| 2010/0328707 A1 | 12/2010 | Miyake | |
| 2011/0007347 A1 | 1/2011 | Kamath et al. | |
| 2011/0013219 A1* | 1/2011 | Nuggehalli et al. | 358/1.15 |
| 2011/0063668 A1 | 3/2011 | Shirai | |
| 2011/0096354 A1 | 4/2011 | Liu | |
| 2011/0145351 A1* | 6/2011 | Lee et al. | 709/206 |
| 2011/0231473 A1 | 9/2011 | Narayanan et al. | |
| 2012/0057204 A1 | 3/2012 | Mizoguchi et al. | |
| 2012/0102413 A1 | 4/2012 | Gnanamoorthy | |
| 2012/0206765 A1 | 8/2012 | Nakajo | |
| 2012/0250074 A1 | 10/2012 | Kamppari et al. | |
| 2012/0250076 A1 | 10/2012 | Kumar et al. | |
| 2012/0272339 A1 | 10/2012 | Kumaravel et al. | |
| 2013/0107312 A1 | 5/2013 | Venkatesh | |
| 2013/0182281 A1* | 7/2013 | Suzuki | 358/1.14 |
| 2013/0308165 A1 | 11/2013 | Venkatesh et al. | |
| 2013/0321855 A1 | 12/2013 | Bhatia | |

FOREIGN PATENT DOCUMENTS

| | | |
|---|---|---|
| CN | 101520829 | 9/2009 |
| JP | 2007133817 | 5/2007 |
| KR | 20060109699 A | 10/2006 |
| WO | WO-0041064 A1 | 7/2000 |
| WO | WO-2012112159 | 8/2012 |
| WO | WO-2012147089 A1 | 11/2012 |

OTHER PUBLICATIONS

"Rules & Routing", http://www.equitrac.com/downloads/5379-Rules-Routing_7-10.pdf, retrieved on Dec. 15, 2010.

"Setting Up Multiple Printers Using Same IP Address with Different Ports", http://www.experts-exchange.com/OS/Microsoft_Operating_Systems/Server/2003_Server/Q_26107790.html, retrieved on Dec. 15, 2010.

"The Enterprise-wide Network Solution for Effective Print Job Management", http://www.ricoh-europe.com/Binary/doc_q_man_tcm101-10420.pdf, retrieved on Dec. 15, 2010.

International Search Report and Written Opinion received in related PCT Application No. PCT/US2011/025293, mailed on Sep. 29, 2011, 9 pgs.

Aranda, D.M., "Architectures for Cloud Providers Federation—Authorization of Diffusion," (Research Paper), Sep. 2011, http://eprints.ucm.es/13513/1/DanielMolina_master.pdf.

Extended European Search Report received in EP Application No. 11864184, Sep. 8, 2014, 9 pages.

Google, "Printing Overview," (Web Page), 3 pages, 2012, found at http://support.google.com/chromeos/a/bin/answer.py?hl=en&topic=1329532&p=mkt_enterprise&answer=1329533.

Hewlett-Packard Company, "Print Where Business Happens," (Research Paper), Jul. 5, 2012, 2 pages.

Hewlett-Packard Development Company, L.P., "Cloud printing in the enterprise: Liberating the mobile print experience from cables, operating systems and physical boundaries," (Executive Summary), Mar. 2010.

Hewlett-Packard Development Company, L.P., "HP Universal Print Driver," Solution and Feature Guide, 2009, 24 pp., http://h20331.www2.hp.com/Hpsub/downloads/UPD5_guide_final,%20web.pdf.

International Preliminary Report on Patentability received in PCT Application No. PCT/IN2011/000423, Nov. 7, 2013, 6 pages.

International Preliminary Report on Patentability received in PCT Application No. PCT/US2011/025293, Aug. 29, 2013, 6 pages.

International Search Report & Written Opinion received for PCT Application No. PCT/IN2011/000423, Feb. 9, 2012, 11 pages.

Namtuk, "Automatic Print Email," (Web Page), 2011, found at http://www.automatic-print-email.com/.

Schwartz, J. et al., "IBM Launches Enterprise Cloud Services," Jun. 16, 2009, 3 pages.

Silveria, L., "Itinerary not displaying in account," TripIt Help Center, Nov. 9, 2009, 2 pages, found at https://tripit.zendesk.com/entries/77324-Itinerary-not-displaying-in-account.

Trapani, G., "TripIt Organizes Your Travel Itinerary Automatically via Email," Lifehacker, Sep. 18, 2007, 3 pages, found at http://lifehacker.com/300833/tripit-organizes-your-travel-itinerary-automatically-via-email.

Wikipedia, "HP ePrint," Oct. 16, 2011, found at <https://web.archive.org/web/20111016081246/http://en.wikipedia.org/wiki/HP_ePrint>.

Wikipedia, "Posterous," Dec. 10, 2010, 3 pages, found at http://en.wikipedia.org/w/index.php?title=Posterous&oldid=401625056.

Wolber, A., "Print anywhere: Chrome, Google Apps and Cloud Print," (Web Page), Oct. 9, 2012, found at http://www.techrepublic.com/blog/google-in-the-enterprise/print-anywhere-chrome-google-apps-and-cloud-print/.

Xerox®, "Xerox® Mobile Print," (Web Page), 2011, found at http://www.office.xerox.com/software-solutions/xerox-mobile-print-solution/enus.html.

\* cited by examiner

GENERATING AN ALIAS EMAIL ADDRESS FOR MANAGING A PRINT JOB

BACKGROUND

Cloud computing is location-independent computing, whereby shared servers provide resources, software, and data to computers and other devices on demand. The term "cloud" is used as a metaphor for the Internet, based on the cloud drawing often used to represent computer networks. Cloud computing describes a supplement, consumption, and delivery model for information technologies services based on the Internet, and can involves over-the-Internet provision of dynamically scalable and often virtualized resources. One key characteristic of cloud computing is that the computing is "in the cloud" e.g. the processing (and the related data) is not in a specified, known or static place(s). Details are abstracted from consumers, who no longer have need for expertise in, or control over, the technology infrastructure "in the cloud" that supports them. This is in contrast to a model in which the processing takes place in one or more specific servers that are known.

In some examples of cloud computing, one or more of the aforementioned resources can include a printer, which can be referred to as a cloud printer. In such a situation, nearly any computing device connected to the computing cloud can print to the cloud printer.

DETAILED DESCRIPTION

Figure 1:
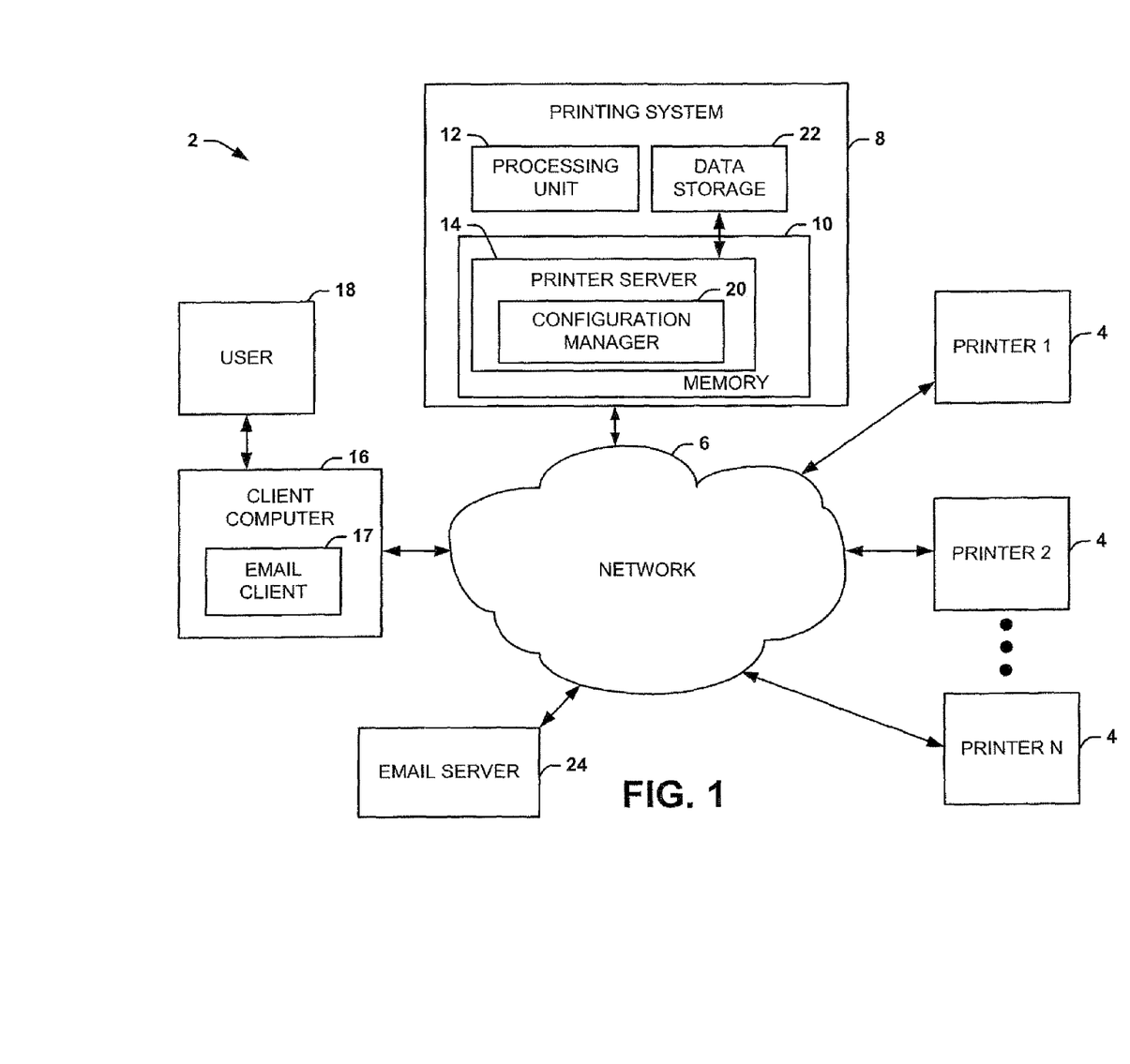
FIG. 1 illustrates an example of a network system for managing a print job.

FIG. 1 illustrates an example of a network system 2 for managing a print job. The network system 2 could be implemented, for example, as a computing cloud. N number of printers 4 can be connected to a network 6, wherein N is an integer greater than or equal to two. The network 6 can be implemented, for example, as the Internet. Nodes on the network 6 can communicate via a communications protocol, such as Transmission Control Protocol/Internet Protocol (TCP/IP), Internet Protocol version 6 (IPv6), etc. Each of the N number of printers 4 can be implemented as a cloud printer, wherein each printer 4 of the N number of printers 4 can be assigned a node address (e.g., an IP address) on the network 6. Each of the N number of printers 4 can be registered with a printing system 8. Moreover, in some examples, each printer 4 of the N number of printers 4 can be designed for a particular type of job. For instance, one or more of the N number of printers 4 could be implemented as a high speed printer that can print a large number of sheets relatively quickly. Additionally or alternatively, one or more of the N number of printers 4 could be implemented as a photograph printer that can print high resolution color photographs. As another example, additionally or alternatively, one or more of the N number of printers 4 could be implemented as a plotter that can print schematics on relatively large sheets of paper (e.g., A0 and/or A1 size paper).

For purposes of simplification of explanation, in the present example, different components of the network system 2 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit), or as a combination of both (e.g., firmware).

The printing system 8 can include, for example, a memory 10 for storing computer executable instructions. The printing system 8 can also include, for example, a processing unit 12 (e.g., one or more processing cores) for accessing the memory 10 and executing computer executable instructions. The memory 10 can include a printer server 14. As described herein, the printer server 14 can route print jobs to a selected printer of the N number of printer 4 based on a received email. The printer server 14 can send network messages to each of the N number of printers 4. The network messages can cause a printer 4 of the N number of printers 4 to process a print job (e.g., print a file). The network messages can include a payload that provides commands to a given printer 4 of the N number of printers 4 in a protocol native to the given printer 4 of the N number of printers 4, which can be referred to as an instruction message. For instance, the instruction message can include printer command language (PCL) commands, portable document format (PDF) commands, HEWLETT PACKARD® Graphics Language (HPGL), commands, etc. To provide the instruction message, the printer server 14 can include a printer driver for each of the N number of printers 4.

As one example, the printer server 14 can receive an email message requesting that a particular file (e.g., a text document, a photograph and/or a schematic drawing) attached to the email message be printed, which file can be referred to as an attached file. In response to such an email message the printer server 14 can convert the attached file into an instruction message, which can cause a printer to print the attached file, in a manner described herein. In such an example, each of the N number of printers 4 can be assigned a unique email address, such that the printer server 14 can receive an email destined for a given unique email address of one or more of the N number of printers 4, and convert the attached file to the aforementioned instruction message. By utilizing such a system of implementation, a client computer 16, from which the email message originated need not include a driver for any of the N number of printers 4, although the client computer 16 is not prohibited from including such a driver. Instead, the client computer 16 needs only to include an email client 17 capable of sending and receiving emails. Accordingly, the client computer 16 can be implemented as nearly any computer that can communicate over the network 6, including but not limited to a desktop or laptop personal computer, a mobile device, such as a smartphone, a personal digital assistant (PDA), etc. Furthermore, since the request for printing is send via email, physical and logical routing distance between the client computer 16 and a given printer 4 of the N number of printers 4 is immaterial. That is, the client computer 16 and the given printer 4 of the N number of printers 4 can be coupled to the same local area network (LAN) or coupled by a wide area network (WAN).

Figure 2:
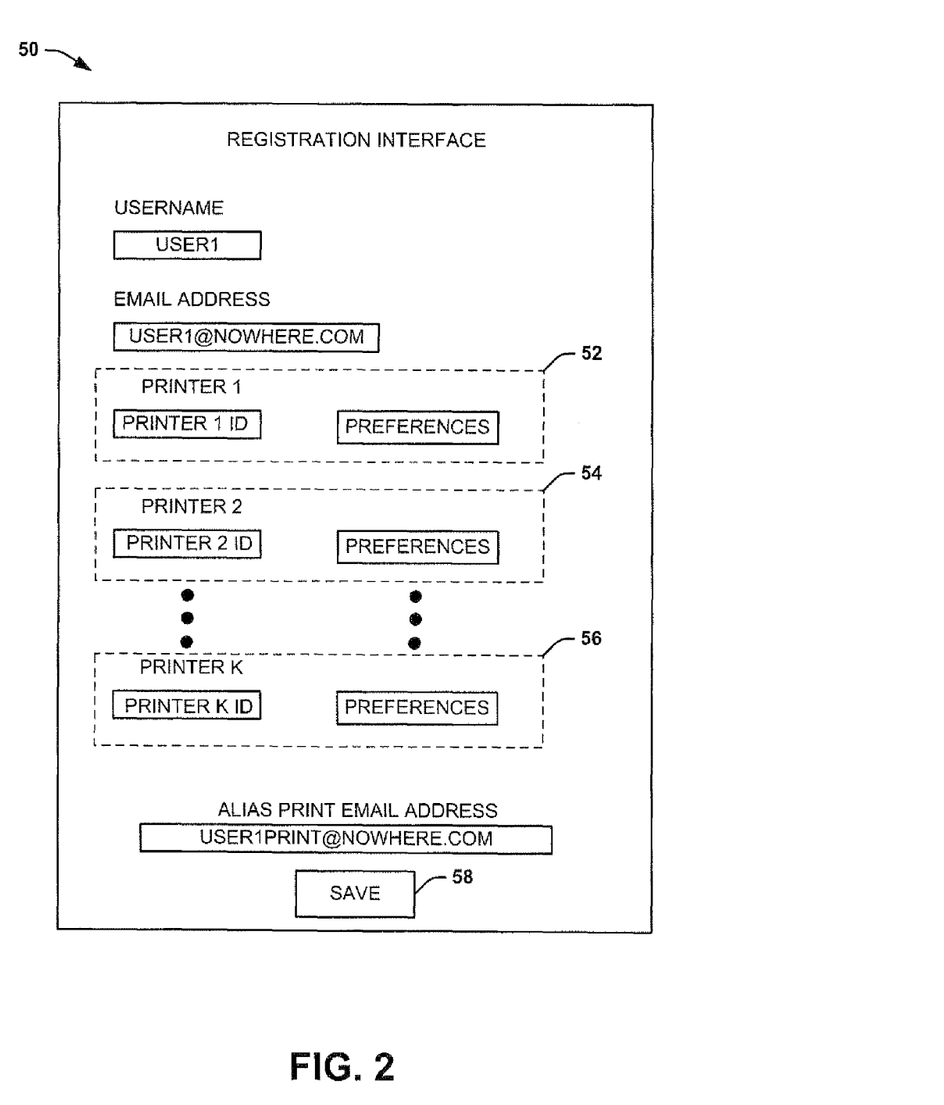
FIG. 2 illustrates an example of an registration interface.
Figure 3:
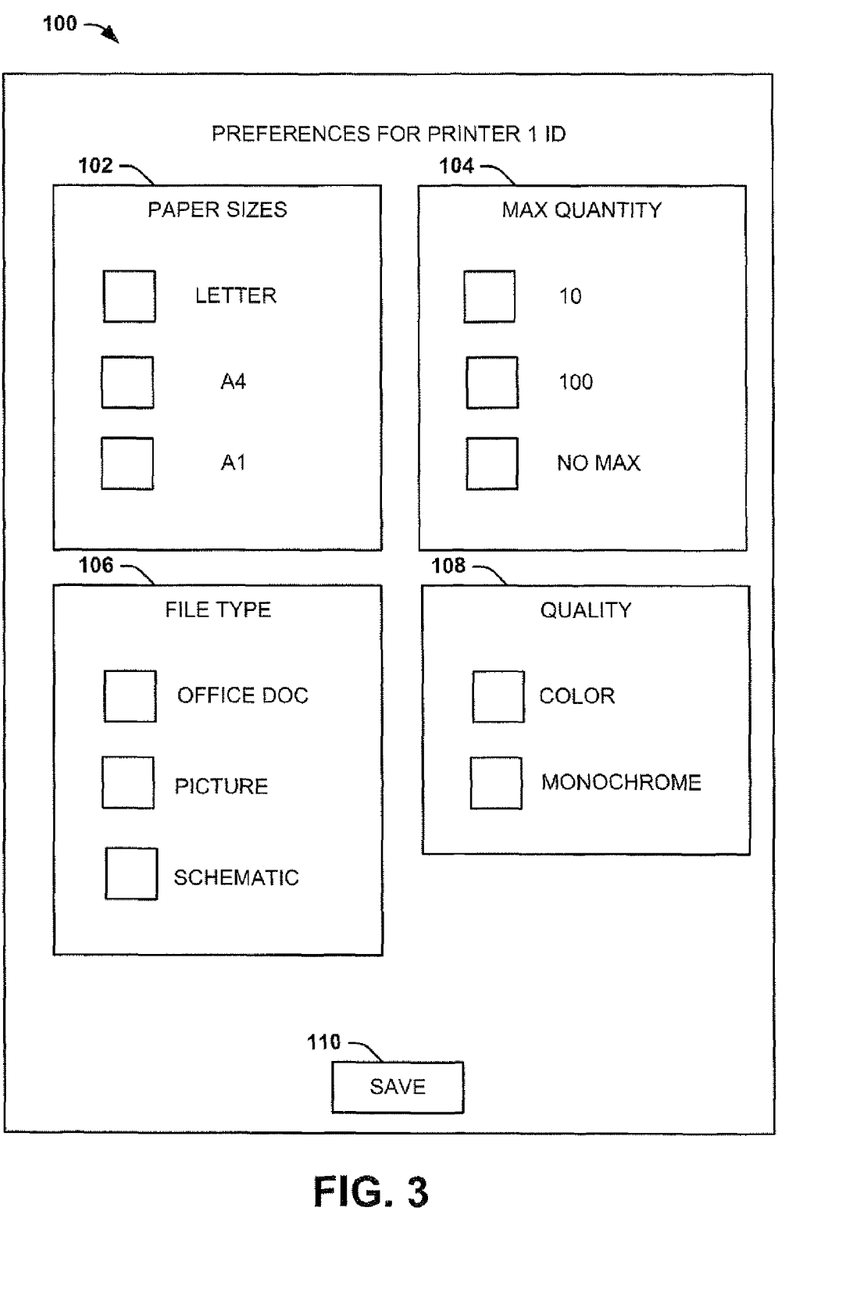
FIG. 3 illustrates an example of a preferences interface.

The unique email address for each printer of the N number of printers 4 can be 30 or more characters long and relatively cryptic so as to prevent unwanted emails (e.g., spam) from being sent to the unique email address of a given printer. Thus, it can be difficult for a user 18 of the client computer 16 to remember the unique email address for any given printer of the N number of printers 4. Accordingly, the network system 2 can provide a mechanism for customizing the printing preferences of the user 18 (e.g., a person) of the client computer 16. In such a situation, the user 18 can access a registration interface of the printer server 14. In one example, the printer server 14 can include a configuration manager 20 that can provide a registration interface that can be implemented as a graphical user interface (GUI), such as a web page. FIG. 2 illustrates an example of a registration interface 50 that could be employed as such a registration interface provided by the configuration manager 20 of FIG. 1. The registration interface 50 can include a text box labeled as "USERNAME" wherein a user (e.g., the user 18 illustrated in FIG. 1) can enter his/her network username. Additionally or alternatively, the user could also enter his/her first and/or last names. In another text box, labeled as "EMAIL ADDRESS," the user can enter his/her email address, Furthermore, K number of printer text boxes 52, 54 and 56 can be included for entering printer identifiers, wherein K is an integer greater than or equal to two. As one example, in a first printer text box 52, labeled in FIG. 2 as "PRINTER 1," the user can enter a printer identifier (labeled in FIG. 2 as "PRINTER 1 ID"), such as an email address for a given printer, such as one of the N number of printers 4 illustrated in FIG. 1. Upon entry of the printer identifier, a user can actuate a virtual button (e.g., by clicking) labeled in FIG. 2 as PREFERENCES that corresponds to the preferences associated with the first printer. In response to such actuation, the user can be provided a preferences interface. FIG. 3 illustrates an example of such a preferences interface 100 for the first printer.

The preferences interface 100 provided a user with a page identifier labeled in FIG. 3 as "PREFERENCES FOR PRINTER ID 1" that includes information that identifies the particular printer for which the user is setting the preferences. The preferences page can include, for example, a paper sizes section 102, a maximum quantity section 104, a file type section 106 and a quality section 108.

The paper sizes section 102 can include, for example, paper list check boxes that include a list of paper sizes that are available for the first printer. In the present example, three sizes are listed, namely, Letter (8.5 inch by 11 inch) (labeled in FIG. 3 as "LETTER"), A4 size (210 mm by 297 mm) (labeled in FIG. 3 as "A4") and A1 size (594 mm×841 mm) (labeled in FIG. 3 as "A1"), but, depending on the configuration of the first printer, other sizes could be listed as well. The user can choose which sizes of paper that he/she desires to be associated with the first printer. For instance, if the first printer is a high speed printer (e.g., a printer that print 40 or more pages per minute), the user may select that "LETTER" and "A4" by virtually checking a check box associated with each chosen paper size.

Additionally, in the maximum quantity section 104, the user can select a maximum number of sheets per printing job for the first printer. In the present example, the user can select a checkbox to indicate that the maximum sheets per print job are 10 (labeled in FIG. 3 as "10"), 100 (labeled in FIG. 3 as "100") or unlimited (labeled in FIG. 3 as "NO MAX"). The user can limit the number of sheets per printing job if, for example, the printer has an expensive paper loaded therein, such as paper with a pre-printed letterhead. Additionally or alternatively, the user may set a maximum number of sheets per print job if the printer is a high resolution printer that is relatively slow (e.g., less than 40 pages per minute).

The file type section 106 can include file type checkboxes for particular file types. The file type can be determined, for example, by an extension of a given file or by parsing the format of the given file. For instance, in the present example, three file types are shown, but other file types could also be included. The first type of file listed in the tile type section 106 is an office document, labeled in FIG. 3 as "OFFICE DOC" and can include, for example, files with an extension indicating that the file is an office document. Such extensions include, for instance, ".doc,".xls, ".ppt," etc. The second type of file listed in the file type section 106 is a picture, labeled in FIG. 3 as "PICTURE," and can include, for example, files with an extension indicating that the file is a picture (e.g., a digital photograph). Such extensions include, for example, ".jpg," ".raw," ".tiff," etc. The third type of file listed in the file type section 106 is schematic, labeled in FIG. 3 as "SCHEMATIC" and can include, for example, files with an extension indicating that the file is a schematic diagram (e.g., architectural drawings, circuit schematic diagrams, engineering drawings, etc.). Such extensions can include, for example, ".drw," "drawing," ".dwg," etc.

The quality section 108 can include quality checkboxes for particular qualities of print. In the present example, two different quality levels for the first printer are illustrated, namely color (labeled in FIG. 3 as "COLOR") and monochrome (labeled in FIG. 3 as "MONOCHROME"). By selecting one or more of the quality checkboxes the user can indicate features of the first printer that the user desires to utilize. For instance, the user may desire to limit all print jobs for the given printer to grayscale (e.g., monochrome), even if the printer has the capability of printing in color. In such a situation, the user could select the monochrome check box and not select the color check box. Upon selecting the preferences for the first printer, the user can click a (virtual) save button 110. Upon clicking the save button 110, the user can be returned to the registration interface 50 illustrated in FIG. 2.

Referring back to FIG. 2, the user can select preferences for the remaining printers 2-K in a manner similar to the preferences selected for printer 1. Upon selecting the preferences for each of the remaining printers 2-K, the user can be provided an alias print email address, labeled in FIG. 2 as "ALIAS PRINT EMAIL ADDRESS" that is unique for the user. In some examples, the user can edit the alias print email address so as to make the alias print email address easier to remember. The user can store the alias print email address in an address book (e.g., contacts) of an email client, such as the email client 17 illustrated in FIG. 1. To exit/complete the registration interface, the user can actuate a virtual save button 58.

Referring back to FIG. 1, upon providing the user 18 the alias print email address, configuration manager 20 of the printer server 14 can store an alias record in data storage 22 for the user 18. The data storage 22 can be implemented, for example, as computer readable memory (e.g., a hard disk, flash memory, random access memory, etc.), and can be internal or external to the printer server 14. The data storage 22 can include, for example, a database and/or a table for storing the record. The record can include, for example, the alias print email address, the list of printers 4 selected by the user 18, the user's preferences for each selected printer, etc. The record can be referred to as an alias record. Moreover, the configuration manager 20 of the printer server 14 can register the alias print email address with an email server 24 connected to the network 6. Upon such registration, the network system 2 can be configured such that an email message sent to the alias printer email address is ultimately received by the printer server 14.

Upon receiving the alias print email address, the user 18 of client computer 16 can decide that a tile needs to be printed. In such a situation, the user 18 can employ the email client 17 of the client computer 16 to generate an email message with the alias print email address as an addressee (e.g., recipient) of the email message. The user 18 can attach the file to be printed and send the email message to the printer server 14 via the email server 24 to generate a print job. The resultant email message can be referred to as a print email message.

Upon reception of the print email message from the user 18, the printer server 14 can access the data storage 22 to retrieve an alias record associated with the addressee of the print email message. The printer server 14 can parse the file attached to the print email message and determine which printer would be best suited to execute a resulting print job, which printer can be referred to a selected printer. The determination can be based on a comparison of the properties of the file attached to the print email message and the printing preferences configured for the user 18 which preferences are stored in the retrieved alias record, which comparison can be referred to as a printer preference comparison. The printer preference comparison can determine (i) if one printer is considered a suitable printer to print the file attached to the print email message (ii) if two or more printers 4 are considered suitable printers 4 to print the file attached to the print email message or (iii) if no printers 4 are considered a suitable printer to print the file attached to the print email message.

The first situation, namely, that that printer server 14 determines that one printer is a suitable printer to print the file attached to the print email message can arise due to the printing preferences of the user 18 and/or the features of the printers 4 included in the retrieved alias record. For instance, if the file attached to the print email message contains a certain number of pages that exceed a page limit (as chosen in the maximum quantity section 104 of the preferences interface illustrated in FIG. 3) for all but a first printer, the first printer can be selected by the printer server 14 as the selected printer. In another example, if the page size of the file attached to the print email message is set to a size compatible with only a second printer (e.g., A1 size), the second printer can be selected by the printer server 14 as the selected printer. In yet another example, if the file type of the file (e.g., an extension of the file or the format of the file) attached to the email message is associated only with a third printer, the third printer can be selected by the printer server 14 as the selected printer.

The second situation, namely, that that printer server 14 determines that two or more printers 4 are suitable to print the file attached to the print email message can arise when the printing preferences of the user 18 and/or the features of the printers 4 included in the retrieved alias record indicate that both printers 4 are capable of printing the file attached to the email message. The second situation can arise, for example, in instances where two of the printers 4 selected by the user 18 have the same (or nearly the same) printing capabilities (e.g., two printers 4 are identical models). In the second situation, the printer server 14 can arbitrate between the two or more printers 4 based on load balancing between the two or more printers 4, the physical location of two or more printers 4 relative to the physical location of the user 18, etc. Thus, the arbitration can result in the printer server 14 selecting one of the two or more printers 4 in the second situation as the selected printer.

The third situation, namely, that the printer server 14 determines that no printers 4 are suitable to print the file attached to the print email message can arise in a number of circumstances. For instance, the third situation can arise if the printer server 14 determines that all printers 4 that would otherwise be suitable to print the file attached to the print email message are out of paper and/or are turned off. As another example, the third situation can arise if the printer server 14 determines that no printer identified in the retrieved alias record has the capability of printing on the size of paper set in the file attached to the email message. Thus, in the third situation, no printer is selected by the printer as the selected printer. Moreover, in the third situation, the printer server 14 can provide a denial email message to the user 18 at a return email address of the print email message indicating that the file attached to the print email message will not be printed. The denial email message can also include a reason that the file attached to the print email message was not printed (e.g., printer out of paper) so that the user 18 can remedy the situation and send a second print email message with the file attached at a later time.

If the printer server 14 has selected a selected printer, the printer server 14 can convert the file attached to the print email message into a set of commands in a printing protocol. Additionally, the printer server 14 can provide an instruction message that includes the set of commands to the selected printer thereby causing the selected printer to process a print job and to print the file attached to the email message. In one example, upon completing the printing, the selected printer can send a completion message to the printer server 14 indicating that the file attached to the print email message has been printed. In such a situation, the printer server 14 can send the user 18 a confirmation email message (by utilizing the return email address of the email message) that indicates that the file attached to the print email message has been printed, as well as an identification of the selected printer. In another example, if the selected printer begins to print in response to the instruction message but encounters an error before completion of the printing (e.g., runs out of paper), the printer can return an failure message to the printer server 14 that indicates that printing has not been completed, and the reason that the printer has not completed the printing. In response to the failure message, the printer server 14 can provide an error email message to the user 18 (by utilizing the return email address of the email message) that indicates that the file attached to the print email message has failed to print, and the reasons for the failure. In this manner, the user 18 can remedy the situation (e.g., fill a paper tray of the selected printer with paper), and the selected printer can resume printing.

By utilizing the network system 2, the user 18 of the client computer 16 need not remember individual printer email addresses for each of the N number of printers 4, which as noted, can be relatively cryptic so as to avoid spamming. Instead, the user 18 can simply utilize the alias print email address. Moreover, the user 18 can change client computers and utilize the same alias print email address, thereby keeping the same preferences for the printers 4 independent of The particular client computer being utilized. Moreover, since the network system 2 allows for manual configuration of the printing preferences, a great degree of flexibility is provided for customization of the network system 2 for individual users' needs.

Figure 4:
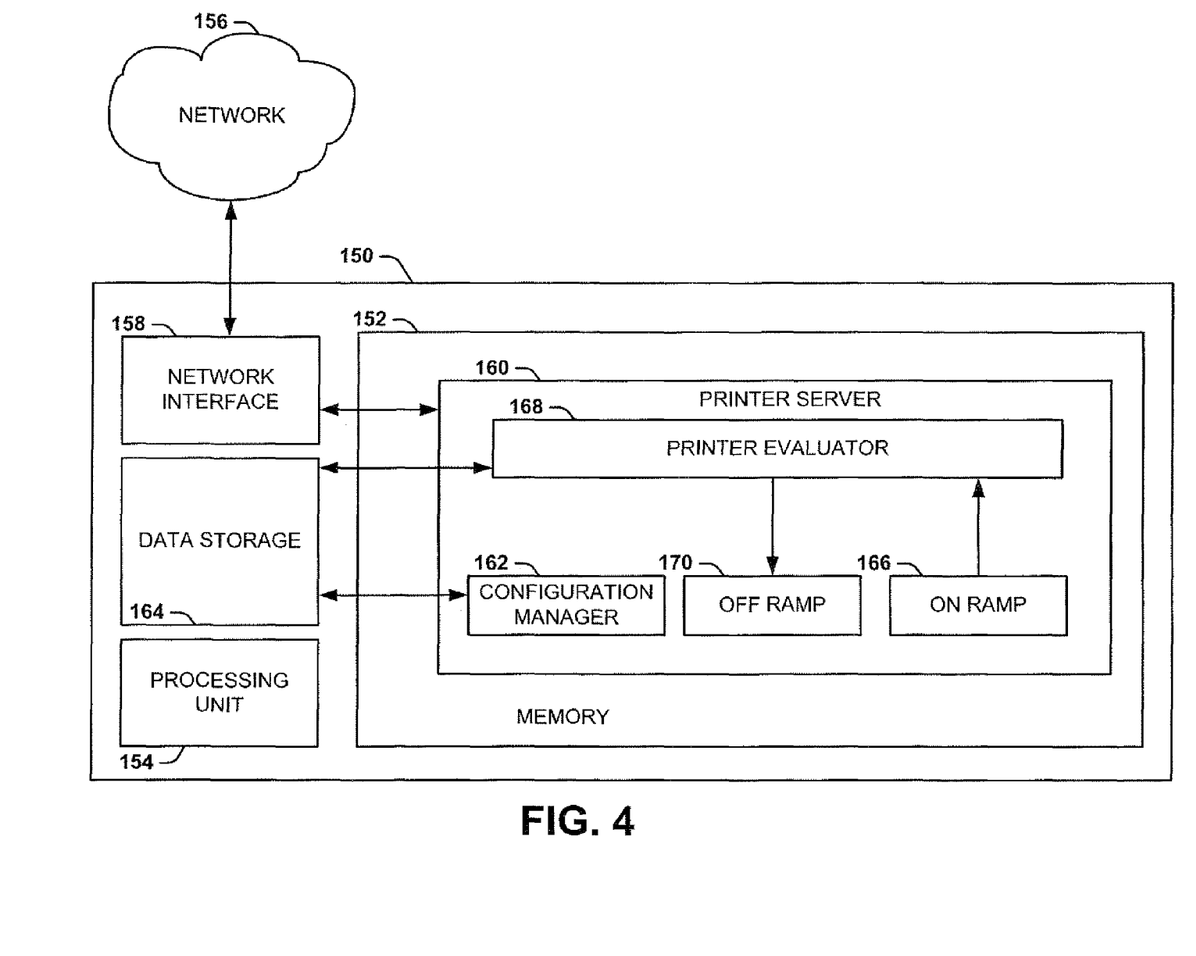
FIG. 4 illustrates an example of a printing system.

FIG. 4 illustrates an example of a printing system 150 that can be utilized to implement, for example, the printing system 8 illustrated in FIG. 1. The printing system 150 can include a memory 152 for storing computer executable instructions. The memory 152 could be implemented, for example, as random access memory, flash memory, a hard disk, a combination thereof, etc. The printing system 150 can also include a processing unit 154 that can access the memory 152 and executes computer executable instructions. The processing unit 154 can be implemented, for example, as one or more processor cores.

The printing system 150 can be coupled to a network 156 (e.g., the Internet) via a network interface 158, which could be implemented as a network interface card. The memory 152 can include a printer server 160 that can manage printing jobs. The printer server 160 can receive a request via the network 156 from a client computer (e.g., the client computer 16 illustrated in FIG. 1) to configure user printing preferences for a plurality of selected printers and to generate an alias print email address for the user of the client computer. In response to the request, a configuration manager 162 can provide a registration interface and/or a preferences interface to the user, such as the registration interface 50 illustrated in FIG. 2 and the preferences interface 100 illustrated in FIG. 3 to generate the alias print email address for the user.

Upon generation of the alias print email address for the user, the configuration manager 162 can store an alias record in a data storage 164 that associates the alias print email address with the user's selected printers and preferences. The data storage 164 could include, for example, a database and/or a table that can store the alias record. The data storage 164 can be implemented, for example, as an internal hard disk, or as a separate system external to the printing system 150. Moreover, the configuration manager 162 can register the alias print email address with an email server (such as the email server 24 illustrated in FIG. 1), such that an email message addressed to the alias print email address is provided to the printer server 160.

The printer server 160 can include an on ramp 166 that receives an email message with an attached file to be printed, which can be referred to as a print email message. The on ramp 166 can provide the print email message to a printer evaluator 168 of the printer server 160. The printer evaluator 168 can evaluate the addressee of the print email message and retrieve an alias record from the data storage 164 associated with an addressee of the print email message (e.g., an alias print email address). The printer evaluator 168 can parse the file attached to the print email message and determine which printer associated with the retrieved alias record would be best suited to execute a resulting print job, which printer can be referred to as a selected printer. The determination by the printer evaluator 168 can be based, for example on a preference comparison based on properties of the file attached to the print email message and the preferences stored in the retrieved alias record, in a manner described herein.

If the printer evaluator 168 does not find a suitable printer to be the selected printer, the printer evaluator 168 can generate a denial email message for the user and forward the denial email message back to the sender of the print message. Conversely, if a selected printer is chosen by the printer evaluator 168, the printer evaluator 168 can provide the print email message and an identification of the selected printer to an off ramp 170 of the printer server 160. In response, the off ramp 170 can convert the file attached to the print email message into a set of commands in a protocol native to the selected printer (e.g., PCL, PDF, HPGL, etc.). The off ramp 170 can send the commands as an instruction message to the selected printer over the network 156, thereby causing the selected printer to process the commands. The processing of the command can result, for example, in a printing of the file attached to the print email message.

The off ramp 170 can receive a status message from the selected printer. The status message could be implemented, for example as completion message or a failure message, as described herein with respect to FIG. 1. In response to the status message, the off ramp 170 can provide an update email message to the user through a return email address of the print email message. The update email message can be implemented, for example, as a confirmation email message or an error email message, as described herein. Thus, the update message provides the sender of the print email message an indication of a status of the print job corresponding to the printing of the file attached to the print email message.

Figure 5:
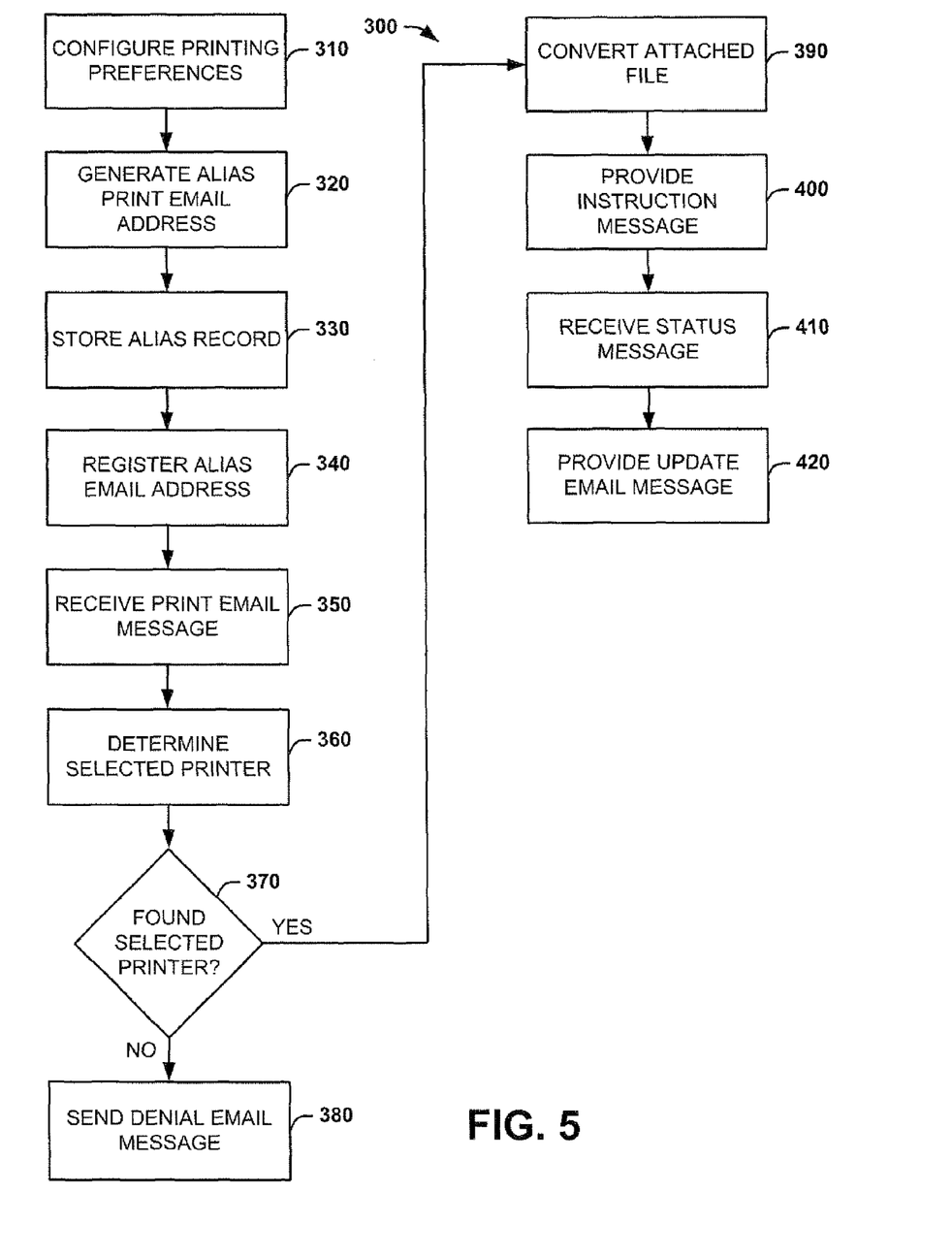
FIG. 5 illustrates an example of a flow chart of a method for managing a print job.

FIG. 5 illustrates a flow chart of an example method 300 for managing a print job. The method 300 could be executed, for example, by a printing system (e.g., the network system 2 illustrated in FIG. 1 and/or the printing system 150 illustrated in FIG. 4). At 310, printing preferences can be configured by a user. As one example, to configure the printing preferences, the user can employ a registration interface and/or a preference interface of a printer server, such as illustrated in FIGS. 2 and 3. At 320, an alias print email address for the user can be generated, for example, by the printer server. At 330, an alias record can be stored, for example in data storage, by the printer server. At 340, the alias email address can be registered, for example, with an email server such that an email message addressed to the alias email address are provided to the printer server.

At 350, a print email message is received at the printer server. The print email message can include an attached file to be printed. At 360, a selected printer that corresponds to the best suited printer for printing the file attached the print email message can be determined. The determination can be based, for example, on a preference comparison of the file type of the file attached to the print email message and printing preferences stored in the alias record. At 370, a determination is made as to whether the selected printer has been found. If the determination as 370 is negative (e.g., NO), the method 300 proceeds to 380. If the determination is positive (e.g., YES), the method 300 proceeds to 390. At 380, a denial email message is provided to the sender of the print email message. The denial email message can indicate that the file attached to the print email message has not been printed, and can also include a reason for not printing the file attached to the print email message (e.g., printer out of paper, printer turned off, etc.)

At 390, the file attached to the print email message can be converted, by the printer server, into a set of commands in a protocol native to the selected printer (e.g., PCL, PDF, HGPL, etc.). At 400, an instruction message including the commands can be provided to the selected printer from the printer server. At 410, the printer server can receive a status message from the selected server. The status message can indicate whether the file attached to the print email message has been printed. At 420, the printer server can provide an update email to the sender of the print email message based on information in the status message.

By utilization of the method 300, a user of a client system (e.g., the sender of the print email message) can print to a plurality of different printers while only knowing a single email address, namely, the alias print email address. Moreover, the method can provide a significant amount of flexibility in configuring the user's preferences for printing.

Figure 6:
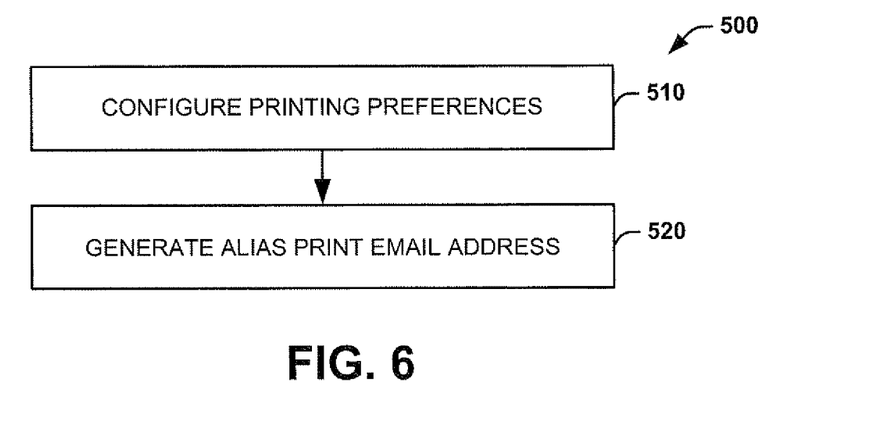
FIG. 6 illustrates another example of a flowchart of a method for managing a print job.

FIG. 6 illustrates another flowchart of an example method 500 for managing a print job. At 510 printing preferences for a user can be configured for at least two different printers. At 520, an alias print email address can be generated. The alias print email address can be associated with each of the at least two different printers.

Figure 7:
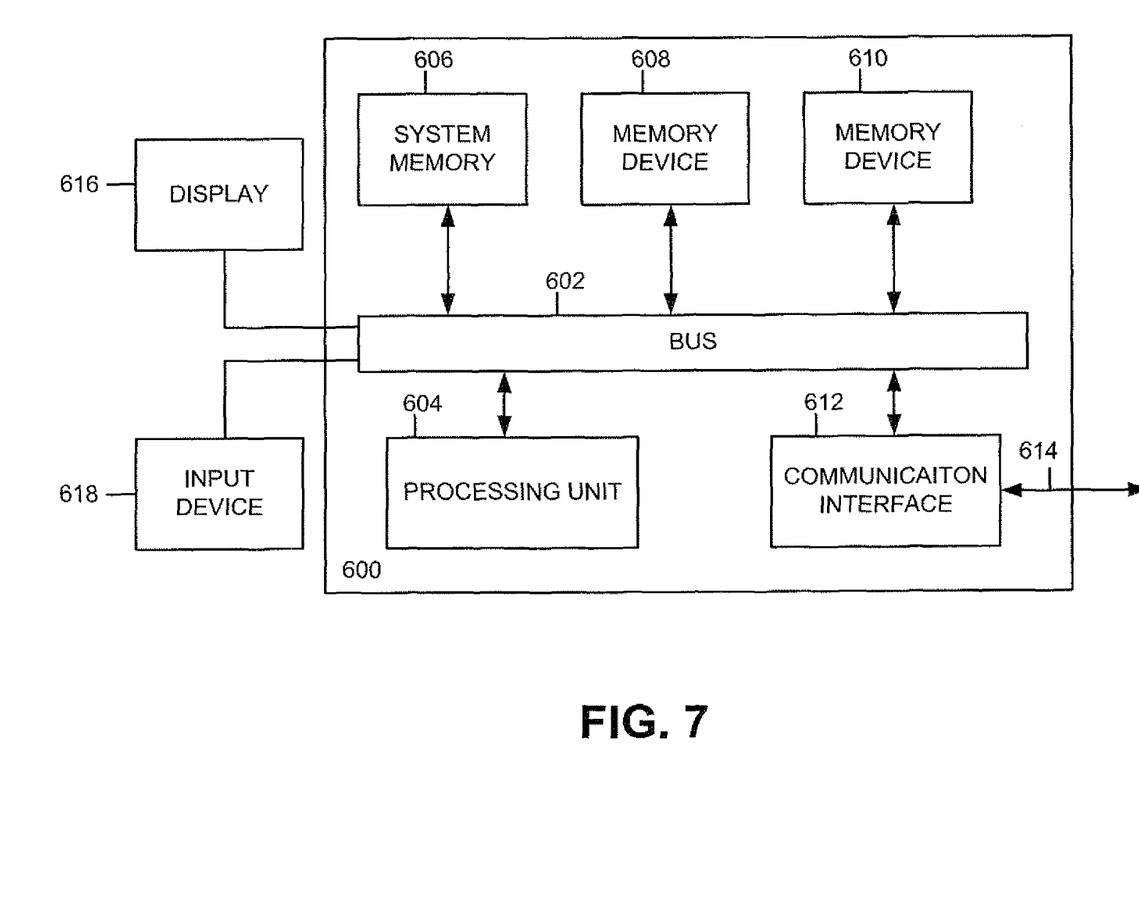
FIG. 7 illustrates an example of a computer system that can be employed to implement the systems and methods illustrated in FIGS. 1-6.

FIG. 7 is a schematic block diagram illustrating an example system 600 of hardware components capable of implementing examples disclosed in FIGS. 1-6, such as the printing system 8, the client computer 16, the email server 24 and portions of the N number of printers 4 illustrated in FIG. 1 and/or the printing system 150 illustrated in FIG. 4. The system 600 can include various systems and subsystems. The system 600 can be a personal computer, a laptop computer, a workstation, a computer system, an appliance, an application-specific integrated circuit (ASIC), a server, a server blade center, a server farm, etc.

The system 600 can includes a system bus 602, a processing unit 604, a system memory 606, memory devices 608 and 610, a communication interface 612 (e.g., a network interface), a communication link 614, a display 616 (e.g., a video screen), and an input device 618 (e.g., a keyboard and/or a mouse). The system bus 602 can be in communication with the processing unit 604 and the system memory 606. The additional memory devices 608 and 610, such as a hard disk drive, server, stand alone database, or other non-volatile memory, can also be in communication with the system bus 602. The system bus 602 operably interconnects the processing unit 604, the memory devices 606-610, the communication interface 612, the display 616, and the input device 618. In some examples, the system bus 602 also operably interconnects an additional port (not shown), such as a universal serial bus (USB) port.

The processing unit 604 can be a computing device and can include an application-specific integrated circuit (ASIC). The processing unit 604 executes a set of instructions to implement the operations of examples disclosed herein. The processing unit can include a processing core.

The additional memory devices 606, 608 and 610 can store data, programs, instructions, database queries in text or compiled form, and any other information that can be needed to operate a computer. The memories 606, 608 and 610 can be implemented as computer-readable media (integrated or removable) such as a memory card, disk drive, compact disk (CD), or server accessible over a network. In certain examples, the memories 606. 608 and 610 can comprise text, images, video, and/or audio.

Additionally, the memory devices 608 and 610 can serve as databases or data storage such as the data storage 22 illustrated in FIG. 1. Additionally or alternatively, the system 600 can access an external system through the communication interface 612, which can communicate with the system bus 602 and the communication link 614.

In operation, the system 600 can be used to implement, for example, a client computer, an email server, a printer server, and at least some components of printers the can be employed in a system that manages a print job. Computer executable logic for implementing the system, such as the memory 10 of the printing system 8 illustrated in FIG. 1 and or the printing system 150 illustrated in FIG. 4, can reside in the system memory 606, and/or in the memory devices 608 and/or 610 in accordance with certain examples. The processing unit 604 executes one or more computer executable instructions originating from the system memory 606 and the memory devices 608 and 610. In such an example, the system memory 606 and/or the memory devices 608 and/or 610 could be employed, for example, to implement the memory 10 illustrated in FIG. 1 and/or the memory 152 illustrated in FIG. 4. The term "computer readable medium" as used herein refers to a medium that participates in providing instructions to the processing unit 604 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A printing system for managing a print job comprising:
a memory storing instructions; and
a processor to access the memory and execute the instructions, to cause the printing system to:
store a record including print preferences of a user for at least two printers;
generate an alias email address associated with the at least two printers and providing the alias email address to the user;
receive an email message addressed to the alias email address, the email message including an attached file;
determine a selected printer, from the at least two printers, to print the attached file based on properties of the attached file and the print preferences; and
route a print job, corresponding to the attached file, to the selected printer for printing.

2. The printing system of claim 1, wherein the executed instructions further cause the printing system to:
provide a registration interface to enable the user to configure the print preferences, wherein the alias email address is provided to the user via the registration interface.

3. The printing system of claim 1, wherein the executed instructions further cause the printing system to:
in response to receiving the email message addressed to the alias email address, retrieve the record based on the alias email address to identify the at least two printers and the print preferences for the at least two printers.

4. The printing system of claim 3, wherein the executed instructions further cause the printing system to:
in response to receiving the email message addressed to the alias email address, parse the attached file to identify the properties of the attached file.

5. The printing system of claim 1, wherein the executed instructions further cause the printing system to:
convert the attached file into a set of commands in a protocol native to the selected printer, wherein the print job comprises the set of commands.

6. The printing system of claim 1, wherein the executed instructions further cause the printing system to:
after routing the print job to the selected printer, receiving a status message, indicating a status of the print job, from the selected printer.

7. The printing system of claim 6, wherein the executed instructions further cause the printing system to:
based on the status message from the printer, sending an update email message to the user, the update email message indicating the status of the print job.

8. A method for managing a print job, the method performed by one or more processors of a printing system and comprising:
storing a record including preferences of a user for at least two printers;
generating an alias print email address associated with the at least two printers and providing the alias email address to the user;

receiving an email message addressed to the alias email address, the email message including an attached file;

determining a selected printer, from the at least two printers, to print the attached file based on properties of the attached file and the print preferences; and routing a print job, corresponding to the attached file, to the selected printer for printing.

9. The method of claim 8, further comprising:

providing a registration interface to enable the user to configure the print preferences, wherein the alias email address is provided to the user via the registration interface.

10. The method of claim 8, further comprising:

in response to receiving the email message addressed to the alias email address, (i) retrieving the record based on the alias email address to identify the at least two printers and the print preferences for the at least two printers, and (ii) parsing the attached file to identify the properties of the attached file.

11. The method of claim 8, further comprising:

after routing the print job to the selected printer, receiving a status message, indicating a status of the print job, from the selected printer.

12. The method of claim 11, further comprising:

based on the status message from the printer, sending an update email message to the user, the update email message indicating the status of the print job.

13. The method of claim 8, further comprising:

converting the attached file into a set of commands in a protocol native to the selected printer, wherein the print job comprises the set of commands.

14. A non-transitory computer-readable medium storing instructions for managing a print job, wherein the instructions, when executed by a processor of a printing system, cause the printing system to:

store a record including print preferences of a user for at least two printers;

generate an alias email address associated with the at least two printers and providing the alias email address to the user;

receive an email message addressed to the alias email address, the email message including an attached file;

determine a selected printer, from the at least two printers, to print the attached file based on properties of the attached file and the print preferences; and route a print job, corresponding to the attached file, to the selected printer for printing.

15. The non-transitory computer-readable medium of claim 14, wherein the executed instructions further cause the printing system to:

convert the attached file into a set of commands in a protocol native to the selected printer, wherein the print job comprises the set of commands.

\* \* \* \* \*

UNITED STATES PATENT AND TRADEMARK OFFICE
CERTIFICATE OF CORRECTION

PATENT NO.         : 9,007,637 B2  
APPLICATION NO.    : 13/984430  
DATED              : April 14, 2015  
INVENTOR(S)        : Sudhindra Venkatesh Kulkarni et al.

It is certified that error appears in the above-identified patent and that said Letters Patent is hereby corrected as shown below:

In the Drawings

In sheet 7 of 7, reference numeral 612, line 1, delete "COMMUNICAITION" and insert --COMMUNICATION--, therefor.

Signed and Sealed this  
Twenty-second Day of March, 2016

Michelle K. Lee  
*Director of the United States Patent and Trademark Office*